(12) United States Patent
Green et al.

(10) Patent No.: US 11,765,449 B2
(45) Date of Patent: Sep. 19, 2023

(54) SYSTEM FOR MAGNETIC MOUNTING AND REGISTRATION OF SENSORS TO GRID CEILINGS

(71) Applicant: VergeSense, Inc., Mountain View, CA (US)

(72) Inventors: Kelby Green, Mountain View, CA (US); Dan Ryan, Mountain View, CA (US); John Stefanski, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 284 days.

(21) Appl. No.: 17/102,357

(22) Filed: Nov. 23, 2020

(65) Prior Publication Data

US 2021/0160406 A1 May 27, 2021

Related U.S. Application Data

(60) Provisional application No. 62/939,549, filed on Nov. 22, 2019.

(51) Int. Cl.
*F16B 1/00* (2006.01)
*H04N 23/54* (2023.01)
*F16M 13/02* (2006.01)

(52) U.S. Cl.
CPC ............ *H04N 23/54* (2023.01); *F16B 1/00* (2013.01); *F16M 13/027* (2013.01); *F16B 2001/0035* (2013.01)

(58) Field of Classification Search
CPC . H04N 5/2253; F16B 1/00; F16B 2001/0035; F16M 13/027
See application file for complete search history.

(56) References Cited

U.S. PATENT DOCUMENTS

| 2010/0207759 A1* | 8/2010 | Sloan | H05B 47/115 |
| | | | 174/491 |
| 2017/0082253 A1* | 3/2017 | Sorensen | F21V 21/34 |

FOREIGN PATENT DOCUMENTS

JP 4411861 B2 * 2/2010 ............. B31D 1/021

* cited by examiner

*Primary Examiner* — Dave Czekaj
*Assistant Examiner* — Berteau Joisil
(74) *Attorney, Agent, or Firm* — Run8 Patent Group, LLC; Peter Miller

(57) ABSTRACT

A system for repeatably mounting an image sensor to a grid ceiling comprising: a mounting member defining an upper face; a set of magnets fixed to the upper face and characterized by a height greater than a protrusion distance of the outer surface of a ceiling tile of the grid ceiling below a grid segment of the grid ceiling; a detachable registration feature transiently coupled to the mounting member, configured to align with the grid ceiling while the set of magnetics are magnetically coupled to the grid ceiling, configured to adhere to the grid ceiling while the set of magnets are magnetically coupled to the grid ceiling, and configured to detach from the upper face and remain adhered to the grid ceiling in response to vertical displacement of the mounting member away from the grid ceiling.

20 Claims, 9 Drawing Sheets

SYSTEM FOR MAGNETIC MOUNTING AND REGISTRATION OF SENSORS TO GRID CEILINGS

CROSS-REFERENCE TO RELATED APPLICATIONS

This application claims the benefit of U.S. Provisional Application No. 62/939,549, filed on 22 Nov. 2019, which is incorporated in its entirety by this reference.

TECHNICAL FIELD

This invention relates generally to the field of ceiling mounting hardware and more specifically to a new and useful method for repeatably mounting sensors to ferromagnetic ceiling features in the field of ceiling mounting hardware.

DESCRIPTION OF THE EMBODIMENTS

Figure 1:
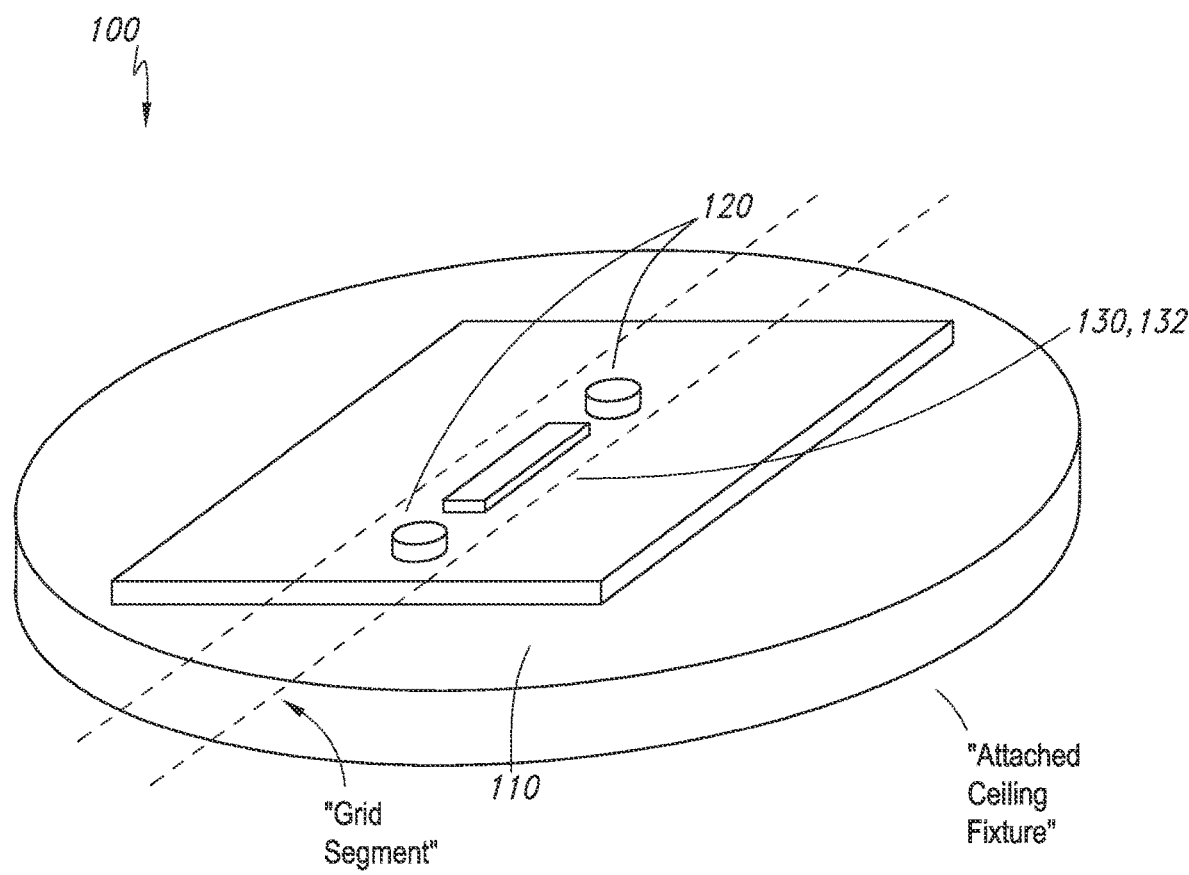
FIG. 1 is a schematic representation of a system.
Figure 1:
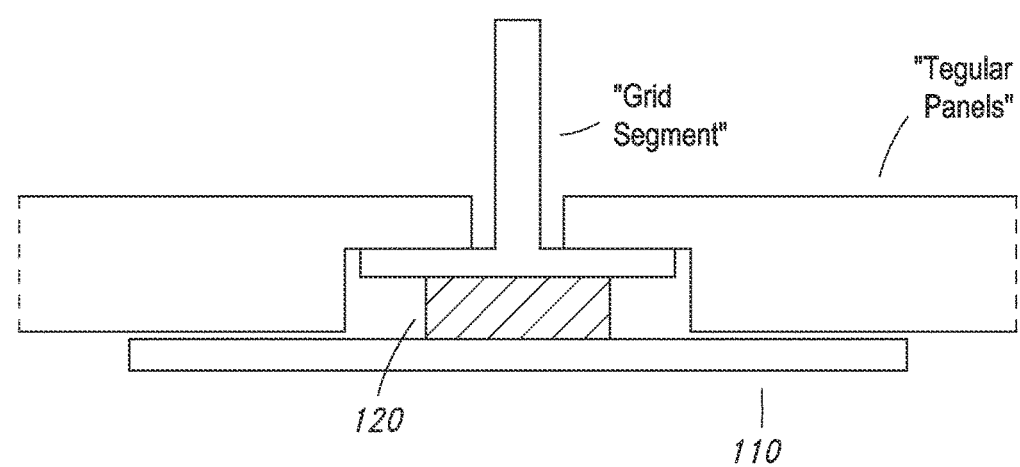

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown FIG. 1, a mounting system 100 (hereinafter "the system 100") for repeatably mounting a ceiling fixture to a grid ceiling, including a set of ceiling tiles supported by an assembly of grid segments, includes a mounting member 110 defining an upper face 112 and a lower face 114 opposite the upper face 112. The system 100 also includes a first magnet 122: fixed to the upper face 112; characterized by a first height greater than a protrusion distance of the outer surface of a ceiling tile in the set of ceiling tiles below a grid segment in the assembly of grid segments; and characterized by a first width less than an exposed width of the grid segment. The system 100 additionally includes a second magnet 124 fixed to the upper face 112 and characterized by the first height. The system 100 further includes a registration feature 13o: arranged on the upper face 112; configured to align with the assembly of grid segments while the first magnet 122 and the second magnet 124 are magnetically coupled to the assembly of grid segments; characterized by a second height less than the first height; and characterized by a second width less than the exposed width of the grid segment.

Figure 9:
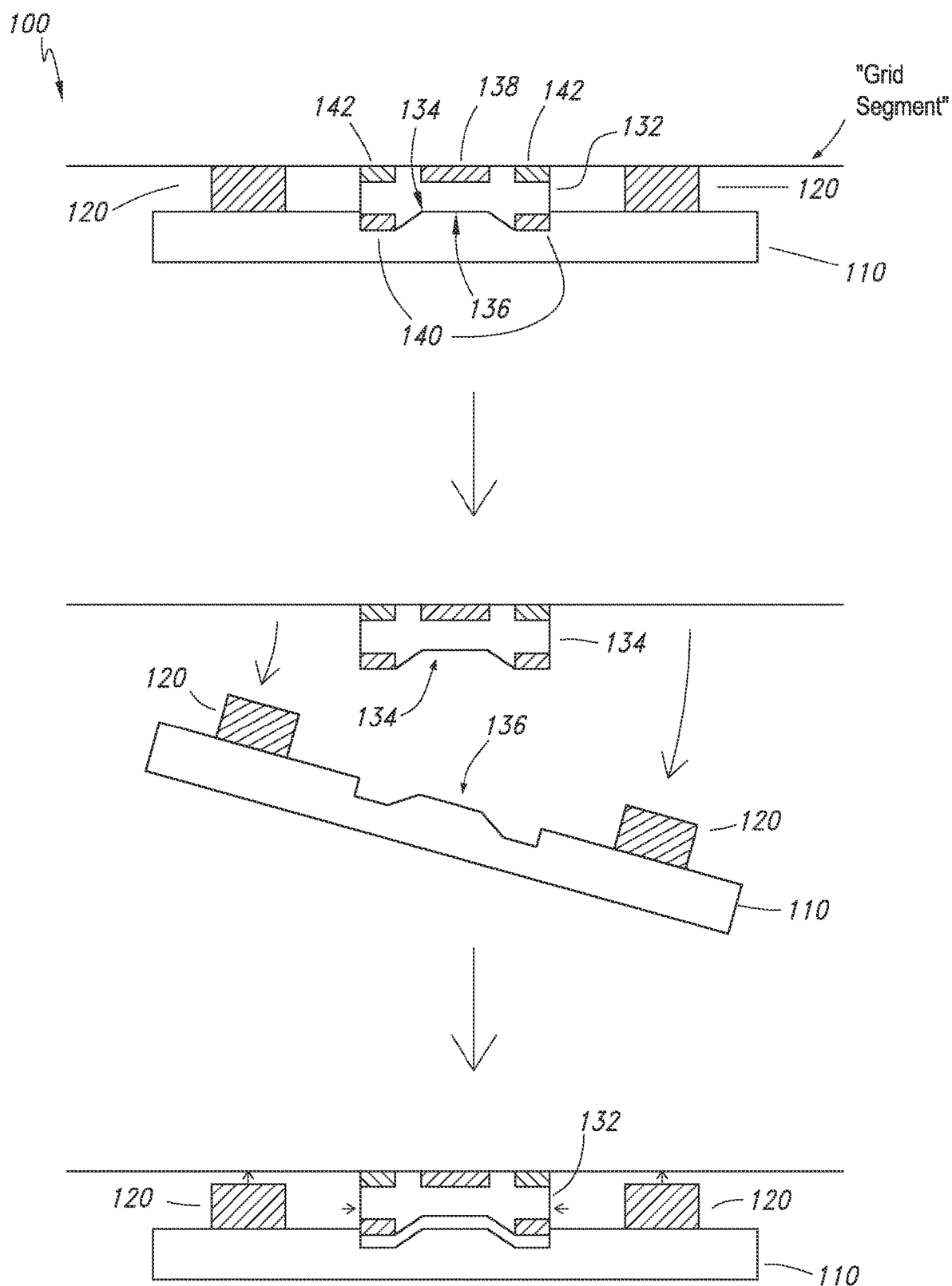
FIG. 9 is a schematic representation of the system.

As shown in FIG. 9, one variation of the system 100 includes: a mounting member 110 defining an upper face 112. This variation of the system 100 also includes a first magnet 122: fixed to the upper face 12; characterized by a first height greater than a protrusion distance of the outer surface of a ceiling tile in the set of ceiling tiles below a grid segment in the assembly of grid segments; and characterized by a first width less than an exposed width of the grid segment. This variation of the system 100 additionally includes a second magnet 124: fixed to the upper face 12; and characterized by the first height. This variation of the system 100 further includes a detachable registration feature 132: transiently coupled to the mounting member 110; characterized by a second width less than the exposed width of the grid segment; configured to align with the assembly of grid segments while the first magnet 122 and the second magnet 124 are magnetically coupled to the assembly of grid segments; configured to adhere to the assembly of grid segments while the first magnet 122 and the second magnet 124 are magnetically coupled to the assembly of grid segments; and configured to detach from the upper face 112 and remain adhered to the assembly of grid segments in response to vertical displacement of the upper face 112 away from the assembly of grid segments.

2. Mounting Kit

A mounting kit 200 for repeatably mounting an image sensor to a grid ceiling including a set of ceiling tiles supported by an assembly of grid segments, includes the mounting system 100 and a set of adapters including a drywall adapter 220, a non-tegular adapter 230, and/or a fixture adapter 210 configured to connect to the image sensor.

3. Applications

Generally, a mounting system (hereinafter "the system 100"), shown in FIG. 1, enables a user to securely and repeatably mount sensors (e.g., image sensor), lighting elements, or other ceiling fixtures to a grid ceiling (i.e. a suspended ceiling, dropped ceiling, T-bar ceiling, or false ceiling) via magnetic coupling to a ferromagnetic grid of the grid ceiling while also facilitating replacement, by a user, of these ceiling fixtures in the same position relative to the grid ceiling after detachment of the system 100 from the grid ceiling—all without requiring the use of tools to remove or attach the system 100 from the grid ceiling. More specifically, the system 100 includes a mounting member 110, a set of magnets 120 affixed to an upper face 112 of the mounting member 110, and a set of registration features 130 arranged on the upper face 112 of the mounting member 110 that are configured to fit between tegular ceiling panels of the grid ceiling. Because of the system's magnetic attachment mechanism to the grid ceiling, the system 100 can facilitate attachment, removal, and replacement of ceiling fixtures to and from grid ceilings without necessitating access to the space above the grid ceiling (e.g., via removal of ceiling panels) and without the use of tools such as screwdrivers, wrenches, etc. Thus, the system 100 can enable easy battery replacement (e.g., for smoke and carbon dioxide detectors, battery powered lighting ceiling fixtures, passive infrared sensors, visual sensors), replacement of expired lighting elements or other components, and/or other general maintenance for ceiling fixtures installed on the grid ceiling.

Additionally, the system 100 can enable precise replacement of these ceiling fixtures, via the arrangement of the set of magnets 120 on the mounting member 110 and the arrangement of the registration feature 130 on the upper face 112 of the mounting member 110, by causing interference between these features of the system 100 and tegular ceiling panels of the grid ceiling when the system 100 is not positioned correctly relative to an intersection or segment of the grid ceiling. Thus, as a user replaces the system 100 and an attached ceiling fixture onto the grid ceiling, the system 100 guides the user to reposition the system 100 in the same position from which it was removed (assuming placement proximal to the same grid intersection or segment).

In one example application of the system 100, a set of image sensors must be arranged on a grid ceiling such that the field of view of each sensor minimally overlaps with the fields of view of its neighboring sensors, the precise placement of each sensor in the grid ceiling may be pre-mapped or otherwise predetermined. Therefore, precise post-maintenance replacement of each sensor to its prior position relative to the grid ceiling can maintain full coverage over a workspace for this set of optical sensors as these optical sensors are serviced over time. The system 100 can therefore enable users to effectively perform maintenance tasks on sets of passive infrared sensors, optical sensors, or other sensors that require precise positioning on the grid ceiling as well as frequent maintenance.

The system 100 can be integrated directly with a ceiling fixture to enable direct mounting of the ceiling fixture to the grid ceiling. Alternatively, a single instance of the system 100 can be configured to mount multiple types of fixtures by interfacing with a set of fixture adapters 210 via a set of attachment features such as brackets, through holes, threaded bores, etc. Furthermore, a single instance of the system 100 can be configured to mount to multiple types of grid ceilings or other types of ceiling by interfacing with a set of ceiling adapters 220. Thus, in some implementations, the system 100 can be configured to attach multiple types of ceiling fixtures to multiple types of ceilings.

In one variation of the system 100, shown in FIG. 9, the system 100 includes a detachable registration feature 132 that, in addition to facilitating alignment of the system 100 with the grid ceiling, also strongly adheres to the grid ceiling such that, when a user removes the system 100 from the grid ceiling, the detachable registration feature 132 detaches from the mounting member 110 and remains attached to the grid ceiling. Thus, when the user proceeds to replace the mounting member 110 and attached ceiling fixture to the ceiling, the detachable registration feature 132 can guide the user to position the mounting member 110 at a repeatable location and orientation (i.e., within 0.5 cm and within 3.0 degrees of the original location and orientation of the system 100 relative to the grid ceiling) and physically constrain the rotation and translation of the system 100 while the mounting member 110 is magnetically coupled to the grid ceiling.

Generally, the system 100 is described herein with reference to a "grid ceiling" including an assembly of grid segments (e.g., ferromagnetic T-bar segments) and a set of tegular panels supported by the assembly of grid segments. However, variations of the system 100 can repeatably (e.g., to within 0.5 cm translation and 3.0 degrees of rotation) attach to other types of grid ceilings (e.g., non-tegular grid ceilings) and/or to other ferromagnetic surfaces that are vertical, horizontal, or inclined.

4. Mounting Member

Generally, the system 100 includes a mounting member 110, which functions as the primary structural element of the system 100. More specifically, the mounting member 110 defines: an upper face 112 defining the registration features 130 or to which the detachable registration feature is transiently coupled, and to which the set of magnets 120 are coupled; and a lower face 114 which can include brackets, through holes, or other attachment mechanisms configured to attach a ceiling fixture or adapter to the system 100 in order to attach these ceiling fixtures to the grid ceiling.

The mounting member 110 can be manufactured from a structurally rigid material sufficient to support the weight of a ceiling fixture for attachment to the ceiling grid such as a formed sheet metal, milled metal, molded metal, or hard plastic. However, the system 100 can include a mounting member 110 including any type of material that can support the gravitational force of the ceiling fixture without significant deformation or degradation as the system 100 hangs from the set of magnets 120 that can be magnetically coupled with the ceiling grid.

The mounting member 110 can define an upper face 112 that sits substantially parallel to the grid ceiling while the system 100 is magnetically coupled to the grid ceiling enabling engagement of registration features 130 arranged on this surface with corresponding features of the grid ceiling (e.g., exposed sections of the ceiling grid between tegular panels of the grid ceiling). In one implementation, the mounting member 110 itself defines the registration features 130 as ridges or extrusions of the upper face 112 of the mounting member 110. Alternatively, the mounting member 110 can define attachment points to enable attachment of the registration feature 130 to the upper face 112 of the mounting member 110.

In one implementation, the mounting member 110 can include visual indicators (e.g., in the form of colored symbols or an asymmetrical shape) to indicate to a user the rotational orientation of the system 100, thereby facilitating accurate placement of the system 100 onto the grid ceiling.

5. Magnets

Generally, the system 100 includes a set of magnets 120 (e.g., permanent magnets) fixed to the upper face 112 of the mounting member 110 that are characterized by a magnetic field strength sufficient to secure the weight of the system 100 and an attached ceiling fixture to the grid ceiling via the attractive force generated by the set of magnets' 120 proximity to the ferromagnetic grid of the grid ceiling. More specifically, the system 100 can include a set of magnets 120 fixed to the upper face 112 of the mounting member 110 in an arrangement that aligns the set of magnets 120 with a recurring arrangement of the assembly of grid segments of the ceiling grid, wherein each magnet in the set of magnets 120 is characterized by a height greater than a protrusion distance of tegular panels (e.g., ceiling tiles) of the grid ceiling below the grid of the grid ceiling and characterized by a width less than an exposed width of the grid segments of the grid ceiling. Thus, while the set of magnets 120 are magnetically coupled to the grid segments of the grid ceiling, the upper face 112 of the mounting member 110 is positioned below the greatest downward extent of the tegular panels of the grid ceiling below the outer surface of the assembly of grid segments (with the exception of any registration features 130 integrated with the mounting member 110). Additionally, the system 100 includes magnets of a width less than the exposed width of each grid segment in the grid ceiling to prevent physical interference of the magnets with the tegular panels of the grid ceiling when the magnets are aligned with the assembly of grid segments.

For example, the system 100 can include a set of two inline magnets configured to magnetically couple along a grid segment in the assembly of grid segments. In another example, the system 100 can include a set of three magnets, two inline and one offset from the two inline magnets, configured to magnetically couple to two intersecting grid segments. Further variations in the number of magnets included in the set of magnets 120 and the arrangement of these magnets on the upper face 112 of the mounting member 110 are further described below.

In one implementation, the set of magnets 120 includes a set of permanent magnets such as rare-earth neodymium magnets in order to increase the strength of the magnetic field produced by these magnets and, therefore, increasing the weight that can be supported by the system 100. However, the system 100 can also include other types of permanent magnets such as those manufactured from other ferromagnetic materials such as alloys of iron, nickel, cobalt, etc. Additionally, the magnets can be coated or covered with a thin layer of a soft material (e.g., rubber, plastic, silicone) to prevent pinching of a user's fingers between a magnet and the grid of the grid ceiling (or any other ferromagnetic object) during installation of the system 100.

The system 100 can include a set of magnets 120 that are securely attached to the mounting member 110 via fasteners, such as nuts and bolts, via integrated retaining flanges (where each magnet is retained under a retaining structure, via co-molding of the set of magnets 120 with the mounting member 110, or via heat staking of the set of magnets 120 to the mounting member 110. The attachment between the set of magnets 120 and the mounting member 110 can withstand forces greater than the attraction force between the set of magnets 120 and the grid of the grid ceiling in order to enable separation of the system 100 from the grid ceiling without separating the mounting member 110 from the set of magnets 120. Therefore, each magnet in the set of magnets 120 is configured to interface with the attachment mechanisms for the magnets, thereby securing each magnet to the upper face 112 of the mounting member 110. For example, the system 100 can include a nut and screw fastening mechanism to attach the set of magnets 120 to the mounting member 110 and, in this example, the system 100 can include a set of magnets 120 defining a countersunk hole through the center of each magnet configured to interface with the head of the screw, thereby enabling the screw to pass through the center of the magnet and the mounting member 110. Each magnet can then be fastened to the mounting member 110 via attachment of a nut to the screw via the underside of the mounting member 110.

The system 100 can include a set of magnets 120 defining a shape configured to fit between tegular panels of the grid ceiling. Therefore, the system 100 can include a variety of magnet shapes. In one implementation, the system 100 includes a set of magnets 120 defining a cylindrical shape in order to reduce the manufacturing cost of the system 100 because this magnet shape is the most commonly available. In another implementation, the system 100 includes a set of magnets 120 defining an annular ring shape to facilitate attachment of the set of magnets 120 to the mounting member 110. Additionally or alternatively, the system 100 can include a set of magnets 120 that define a rectangular horizontal cross-section, where one side of the width of the rectangular cross section is less than the width of the exposed grid between tegular panels of the grid ceiling. These magnets that define a rectangular horizontal cross-section can also include through holes or countersinks to enable attachment of the set of magnets 120 to the mounting member 110. However, the system 100 can include magnets defining any other shape that can fit between tegular panels of the grid ceiling.

The system 100 can also include a set of magnets 120 that are fixed to and arranged across the upper face 112 of the mounting member 110 based on the weight distribution (e.g., the center of gravity in the horizontal plane) of the ceiling fixture configured to be attached to the system 100 and mounted to the grid ceiling. For example, the system 100 can include an arrangement of the set of magnets 120 that is rotationally symmetric about the center of gravity of the assembly of the system 100 and the attached ceiling fixture in the horizontal plane. However, the system 100 can include arrangements that deviate from this rule when the magnetic force exerted by the magnets greatly exceeds the weight of the system 100 and attached ceiling fixture.

6. Registration Features

Generally, the system 100 can include a set of registration features 130 arranged on the upper face 112 of the mounting member 110 and configured to engage or align with gaps between tegular panels of the grid ceiling in order to further aid a user in aligning the system 100 with the ceiling grid when placing the system 100 onto the grid ceiling. More specifically, the system 100 can include a registration feature 130: arranged on the upper face 112 of the mounting member 110; configured to align with the grid of the grid ceiling while the set of magnets 120 is magnetically coupled to the grid of the grid ceiling; characterized by a height less than the height of the magnets; and characterized by a width less than an exposed width of the grid of the grid ceiling. Thus, the system 100 includes registration features 130 that fit between protruding tegular panels of the grid ceiling but do not come into contact with the tegular panels or the grid itself when the system 100 is correctly positioned relative to the grid of the grid ceiling and the magnets are magnetically coupled to the grid of the grid ceiling. Therefore, if a user attempts to magnetically couple the system 100 to the grid of the grid ceiling in a manner that causes the registration features 130 to interfere with the tegular panels of the grid ceiling, the user may intuit that she will need to reposition the system 100 relative to the grid in order to correctly position the system 100.

In one implementation, the set of registration features 130 are integrated with the upper face 112 of the mounting member 110 and are extrusions of the material of the mounting member 110. Additionally or alternatively, the registration features 130 can be manufactured as separate replaceable features that can be assembled with the mounting member 110 to define particular offsets of the system 100 from an intersection of the grid of the grid ceiling. The particular arrangement of the set of registration features 130 on the upper face 112 of the mounting member 110 is further described below with respect to the variations enumerated.

7. Detachable Registration Feature

Generally, the system 100 can include a detachable registration feature 132 that is initially coupled to the mounting member 110 of the system 100 upon initial placement of the system 100 against the assembly of grid segments of the grid ceiling. During initial placement, the detachable registration feature 132 strongly adheres (e.g., via magnetic coupling, chemical adhesive) to the assembly of grid segments such that, upon removal of the system 100 from the ceiling, the detachable registration feature 132 decouples from the mounting member 110 and remains attached to the assembly of grid segments in the same position and orientation with which the detachable registration feature was initially placed. When a user attempts to replace the mounting member 110 and attached ceiling fixture to the grid ceiling via the set of magnets 120, the detachable registration feature 132 visually indicates the original position and orientation of the system 100 on the grid ceiling and, via inclusion of a rotationally and translationally constraining engagement surface 134 on the detachable registration feature 132 and an interlocking surface 136 on the mounting member 110, the detachable registration feature 132 physically guides the mounting member 110 and attached ceiling fixture back into the initial position and orientation of the system 100 relative to the grid ceiling upon magnetic coupling of the set of magnets 120 with the assembly of grid segments. Thus, the system 100 can include the detachable registration feature to enable increased repeatability not limited by the slack tolerances of tegular panels spacing when resting on the assembly of grid segments.

In one implementation, the system 100 includes a detachable registration feature 132 defining an engagement surface 134 with the mounting member 110 that is: configured to engage with an interlocking surface 136 of the mounting member 110 in response to replacement of the set of magnets (e.g., the first magnet 122 and the second magnet 124) against the assembly of grid segments when the mounting member 110 is placed over the detachable registration feature 132; and configured to constrain an orientation and a location of the mounting member 110 relative to the assembly of grid segments in response to engagement with interlocking surface 136 of the mounting member 110 and while the set of magnets 120 are magnetically coupled to the assembly of grid segments and while the detachable registration feature 132 is adhered to the assembly of grid segments. In this implementation, the system 100 can include a detachable registration feature 132 defining an engagement surface 134 with a set of rotationally asymmetric features (e.g., slots, bores, fillets, extrusions), which engage and/or interlock with corresponding features of the interlocking surface 136 of the mounting member 110. Additionally, the system 100 can include a mounting member 110 defining a filleted or chamfered interlocking surface 136 that, when biased against a correspondingly filleted or chamfered engagement surface 134 of the detachable registration feature 132 (e.g., by the magnetic attraction between the set of magnets 120 and the assembly of grid segments) causes the mounting member 110 to rotate and/or translate to align with the position and orientation of the detachable registration feature 132. For example, the engagement surface 134 of the detachable registration feature 132 can define a filleted and/or chamfered L-shaped impression and the interlocking surface 136 of the mounting member 110 can define a matching L-shaped extrusion. Thus, when the interlocking surface 136 is bias against the engagement surface 134 the features of the two surfaces interlock to slide the mounting member 110 into approximately the same position and orientation (relative to the detachable registration feature 132 and the grid ceiling) into which the mounting member 110 was initially placed.

In another implementation, the system 100 can include a detachable registration feature 132 that is configured to adhere to the assembly of grid segments more strongly than the detachable registration feature 132 is initially coupled to the mounting member 110. More specifically, the system 100 can include a detachable registration feature 132: transiently coupled to the mounting member 110 with a first adhesive force; and configured to adhere to the assembly of grid segments with a second adhesive force greater than the first adhesive force. Thus, when a user applies a downward force to the mounting member 110 or the attached ceiling fixture in order to remove the system 100 from the grid ceiling, the mounting member 110 and attached ceiling fixture detach from the detachable registration feature 132 and the detachable registration feature 132 remains adhered to assembly of grid segments.

In the aforementioned implementation, the system 100 can include a detachable registration feature 132 including a grid adhesive mechanism 138 and a mounting member coupling mechanism 140. In this example, the grid adhesive mechanism 138 is configured to adhere to the assembly of grid segments more strongly that the mounting member coupling mechanism is configured to couple to the mounting member 110, thereby enabling the detachable registration feature to remain attached to the assembly of grid segments upon removal of the mounting member 110 from the assembly of grid segments.

In one example, the system 100 can include a detachable registration feature 132 including a magnet as the grid adhesive mechanism 138 and a weaker magnet as the mounting member coupling mechanism 140. Thus, in this example, the system 100 includes a detachable registration feature 132: magnetically coupled to the mounting member 110 with a first magnetic coupling force; and configured to magnetically couple to the assembly of grid segments with a second magnetic coupling force greater than the first magnetic coupling force.

In another example, the system 100 can include a detachable registration feature 132 including a non-magnetic adhesive mechanism—such as a flat surface coated in a chemical adhesive—as the grid adhesive mechanism 138 and a magnet as the mounting member coupling mechanism 140. Thus, in this example, the system 100 includes a detachable registration feature 132: magnetically coupled to the mounting member 110 with a magnetic coupling force; and configured to adhere to the assembly of grid segments with a non-magnetic adhesive force greater than the magnetic coupling force.

In yet another example, the system 100 can include a detachable registration feature 132 including the grid adhesive mechanism 138 and a mechanical coupling—such as latch, buckle, snap, or any other mechanical coupling—as the mounting member coupling mechanism 140. In this example, as user may operate the mechanical coupling (e.g., to disengage the latch or buckle) in order to decouple the mounting member 110 from the detachable registration feature 132. Thus, the system 100 can include a detachable registration feature: mechanically coupled to the mounting member 110; and configured to adhere to the assembly of grid segments.

In another implementation, the system 100 can include a detachable registration feature 132 that couples to the assembly of grid segments more strongly than the set of magnets 120 magnetically couple to the assembly of grid segments in order to reduce the frequency with which a user may accidentally displace or remove the detachable registration feature 132 from the assembly of grid segments while attempting to remove only the mounting member 110 and the attached ceiling fixture. Thus, the system 100 includes: the set of magnets 120 (e.g., the first magnet 122 and the second magnet 124) characterized by a combined magnetic coupling force to the assembly of grid segments; and the detachable registration feature 132 configured to adhere to the assembly of grid segments with an adhesive force greater than the combined magnetic coupling force and the adhesive force.

In yet another implementation, the detachable registration feature 132 can include a rubberized contact surface 142 in order to increase friction between the detachable registration feature 132 and the assembly of grid segments during magnetic coupling of the detachable registration feature 132 to the assembly of grid segments, thereby increasing the shear force at the upper surface of the detachable registration feature 132 required to displace the detachable registration feature 132 along the surface of the assembly of grid segments. More specifically, the system 100 can include a detachable registration feature 132 a rubberized contact surface 142, the rubberized contact surface configured to contact the assembly of grid segments while the detachable registration feature 132 is adhered to the assembly of grid segments. Thus, the rubberized contact surface 142 can prevent slippage of the detachable registration feature relative to the assembly of grid segments and ensure the repeatability in the replacement of the mounting member 110 onto the grid ceiling based on the detachable registration feature.

8. Magnet and Registration Feature Configurations

Generally, the system 100 can be configured in a number of variations specific to particular applications of the system 100. More specifically, each variation of the system 100 includes an arrangement of the set of magnets 120 and registration features 130 that are configured to engage with a particular position—such as a position in line with a grid segment or a position along a grid segment offset from a grid intersection—in the repeated pattern of the grid of the grid ceiling. Additionally, the system 100 can include a variable number of magnets in the set of magnets 120 to constrain the positioning of the system 100 and to vary the maximum weight that can be supported by the set of magnets 120.

Any of the variations described below can include additional magnets arranged to engage with the same grid segments of the grid ceiling as the enumerated magnets in order to provide additional magnetic force to secure the system 100 to the grid ceiling.

8.1 Two-Magnet in-Line Registration Variation

As shown in FIG. 1, in the two-magnet parallel registration variation of the system 100, the system 100 can include a set of two magnets and/or a registration feature 130 in-line with these two magnets. More specifically, the system 100 can include a registration feature 130 or detachable registration feature 132 aligned with a first magnet 122 and a second magnet 124 (while transiently coupled to the mounting member 110, in implementations including the detachable registration feature 132). Thus, the system 100 in this variation can be magnetically coupled along any straight segment of the grid and is constrained along this straight segment by the set of magnets 120 and/or the registration feature 130 in-line with these magnets. Therefore, this variation of the system 100 can be utilized in applications where one-dimensional translation/adjustment of the system 100 (e.g., translation along the straight segment of the grid) is desirable.

In one implementation of this variation, the system 100 includes registration feature(s) 130 arranged on either side of the two in-line magnets to aid a user in guiding the system 100 in between tegular panels of the grid ceiling in order to magnetically couple the system 100 to the grid of the grid ceiling. Alternatively, the system 100 can include a registration feature 130 between the set of two magnets in order to center the system 100 relative to the tegular panels on either side of the grid segment to which the system 100 is magnetically coupled.

8.2 Two-Magnet Perpendicular Registration Variation

Figure 2:
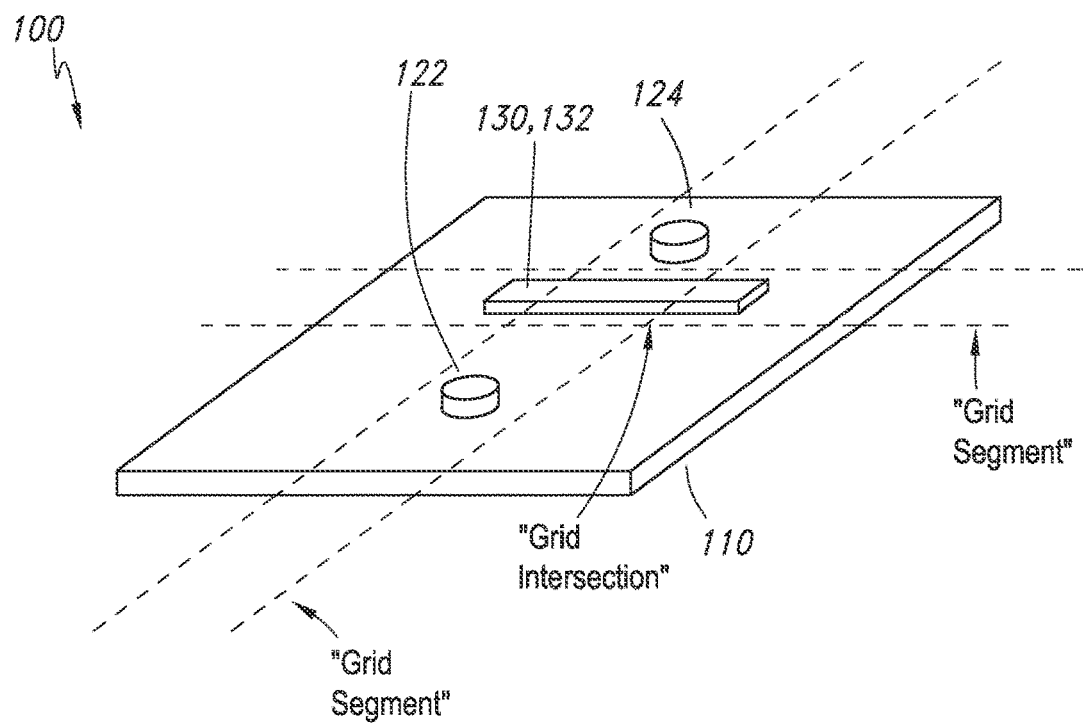
FIG. 2 is a schematic representation of the system.
Figure 2:
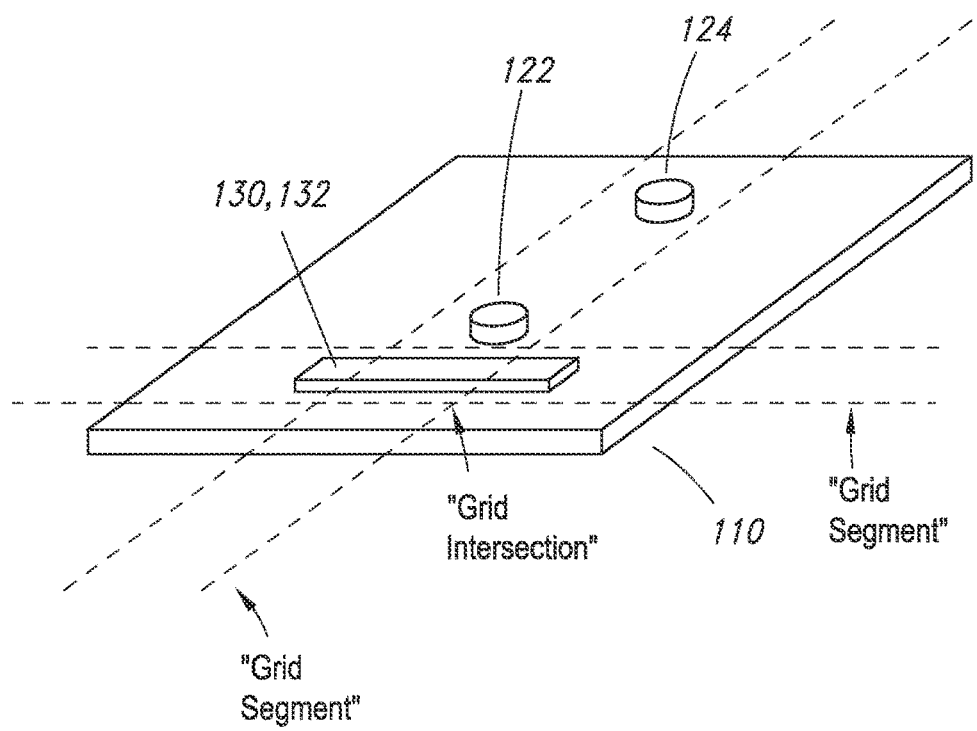

As shown in FIG. 2, in the two-magnet perpendicular registration variation, the system 100 includes a set of two magnets and a registration feature 130 arranged perpendicular to the in-line magnets. More specifically, the system 100 can include a registration feature 130 or a detachable registration feature 132 arranged perpendicular to a first magnet 122 and a second magnet 124 (while transiently coupled to the mounting member 110, in implementations including the detachable registration feature). Thus, the system 100, in this variation, can be magnetically coupled at rotationally symmetric positions about a grid intersection in the ceiling grid and is fully constrained in this position by the set of two magnets and the perpendicular registration feature 130. Therefore, this variation of the system 100 can be utilized in applications that require only 90-degree incremental rotational adjustment and the magnetic coupling force of only two-magnets.

In one implementation of this variation, the system 100 includes a registration feature 130 on either side of the two in-line magnets (and perpendicular to these magnets) to enable this registration feature 130 to fit between tegular panels on either side of the grid segment perpendicular to the grid segment to which the set of two magnets are magnetically coupled.

Alternatively, the system 100 can include a registration feature 130 between the set of two magnets and perpendicular to the in-line set of two magnets, thereby enabling the system 100 to span an intersection of the grid of the grid ceiling. More specifically, the system 100 can include a registration feature 130 or a detachable registration feature 132 perpendicular to and arranged between the first magnet 122 and the second magnet 124 while transiently coupled to the mounting member 110.

In another implementation of this variation, the system 100 can include a single registration feature laterally offset (on one side) and perpendicular to the set of two magnets. More specifically, the system 100 can include a registration feature 130 or a detachable registration feature 132 laterally offset from the first magnet 122 in a first direction and the second magnet 124 in the first direction.

8.3 Three-Magnet Variation

Figure 3:
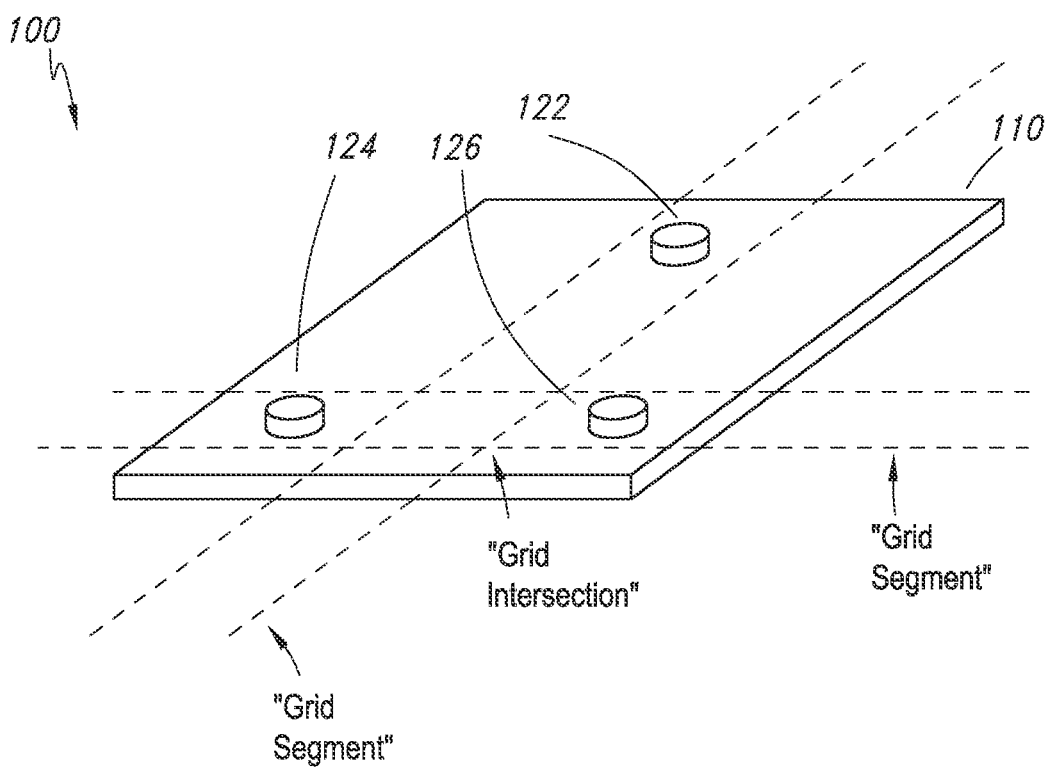
FIG. 3 is a schematic representation of the system.
Figure 3:
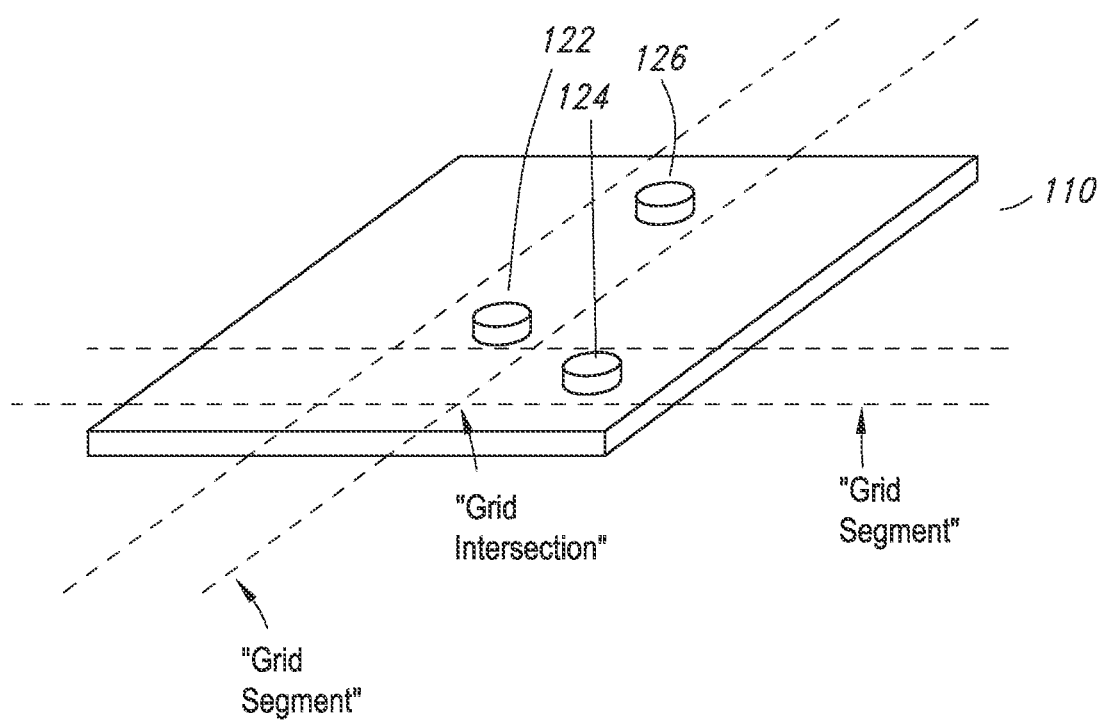

As shown in FIG. 3, in the three-magnet variation, the system 100 includes a set of three magnets. More specifically, the system 100 can include a third magnet 126 that is fixed to the upper face 112 and characterized by the same height as the first magnet 122 and the second magnet 126. Thus, the system 100 in this variation can be magnetically coupled at rotationally symmetric positions about a grid intersection in the grid of the ceiling grid and is fully constrained in this position by two of the set of three magnets magnetically coupled to a first grid segment while the third of the set of three magnets is magnetically coupled to a second perpendicular grid segment. Therefore, this variation of the system 100 can be utilized in applications that require only 90-degree incremental rotational adjustment and the magnetic coupling force of three magnets.

In one implementation of this variation, the system 100 includes two in-line magnets and one magnet offset from the line formed by the two in-line magnets and arranged in-between these two magnets in the dimension parallel with this line, thus forming an acute triangle between the set of three magnets. In this implementation, the system 100 can be magnetically coupled in a position that is more closely centered to the grid intersection in the grid ceiling.

Alternatively, the system 100 includes two in-line magnets and one magnet offset from the line formed by the two in-line magnets and arranged on either side of the two magnets in the dimension parallel with this line, thus forming an obtuse triangle between the set of three magnets. In this implementation, the system 100 can be magnetically coupled in a position offset from the intersection in the grid ceiling along a grid segment extending from this grid intersection.

8.4 Four-Magnet Variation

Figure 4:
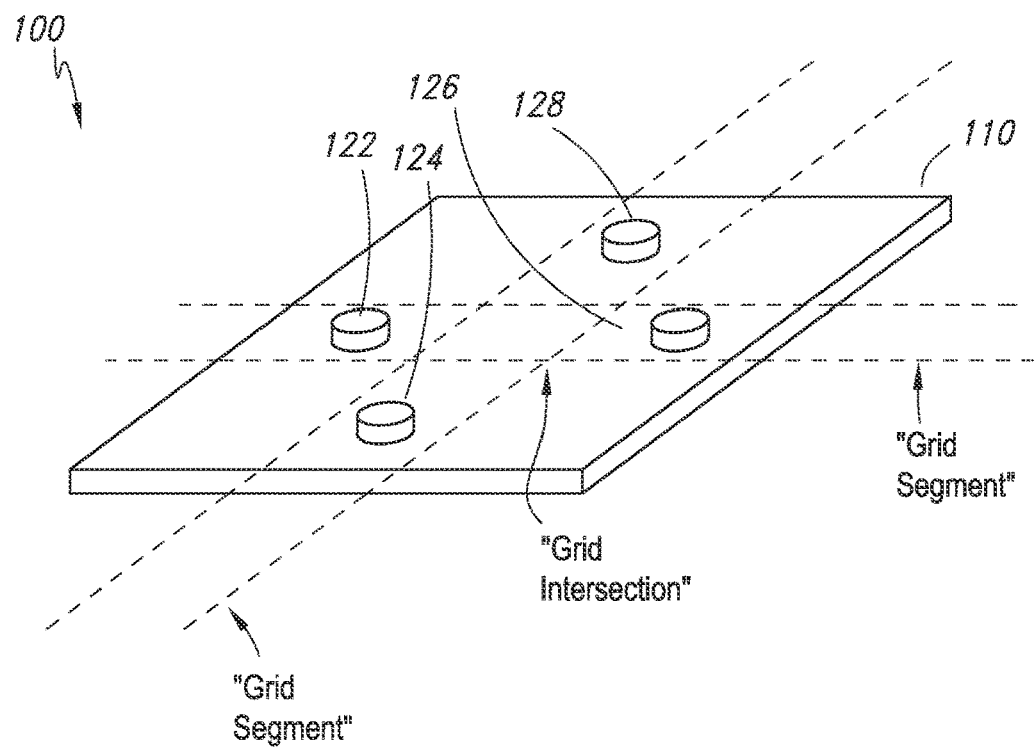
FIG. 4 is a schematic representation of the system.
Figure 4:
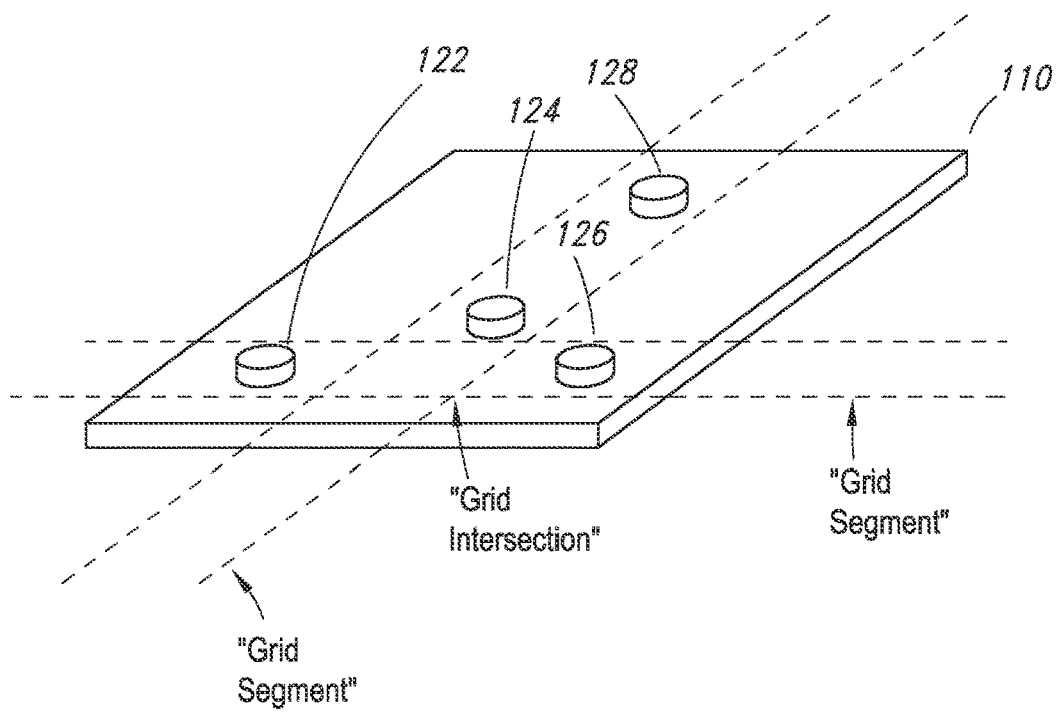

A shown in FIG. 4, in the four-magnet variation, the system 100 includes a set of four magnets arranged in a cross configuration (e.g., two sets of in-line magnets forming two perpendicular lines). More specifically, the system 100 can include: a third magnet 126 fixed to the upper surface 112 and characterized by a first height (e.g., the same height as the first magnet 122 and the second magnet 124); and a fourth magnet 128 fixed to the upper surface 112, characterized by the first height, and aligned with the third magnet 126 perpendicular to the first magnet 122 and the second magnet 124. Thus, the system 100 in this variation can be magnetically coupled at rotationally symmetric positions about a grid intersection in the ceiling grid and is fully constrained in this position by the set of four magnets, where a first set of two of the four magnets is magnetically coupled to a first grid segment and a second set of two of the four magnets is magnetically coupled to a second grid segment perpendicular to the first grid segment. Therefore, this variation of the system 100 can be utilized in applications that require only 90-degree incremental rotational adjustment and the magnetic coupling force of four magnets.

In one implementation of this variation, the system 100 includes a first set of two in-line magnets forming a first line and a second set of two in-line magnets forming a second line perpendicular to the first line where the second perpendicular line passes in-between the first set of two magnets. Thus, in this implementation, the system 100 can be centrally positioned under a grid intersection of the ceiling grid.

Alternatively, the system 100 includes a first set of two in-line magnets forming a first line and a second set of two in-line magnets forming a second line perpendicular to the first line wherein the second perpendicular line does not pass between the first set of two magnets. Thus, in this implementation, the system 100 can be positioned offset from a grid intersection of the ceiling grid.

9. Integrated Fixture

Figure 5:
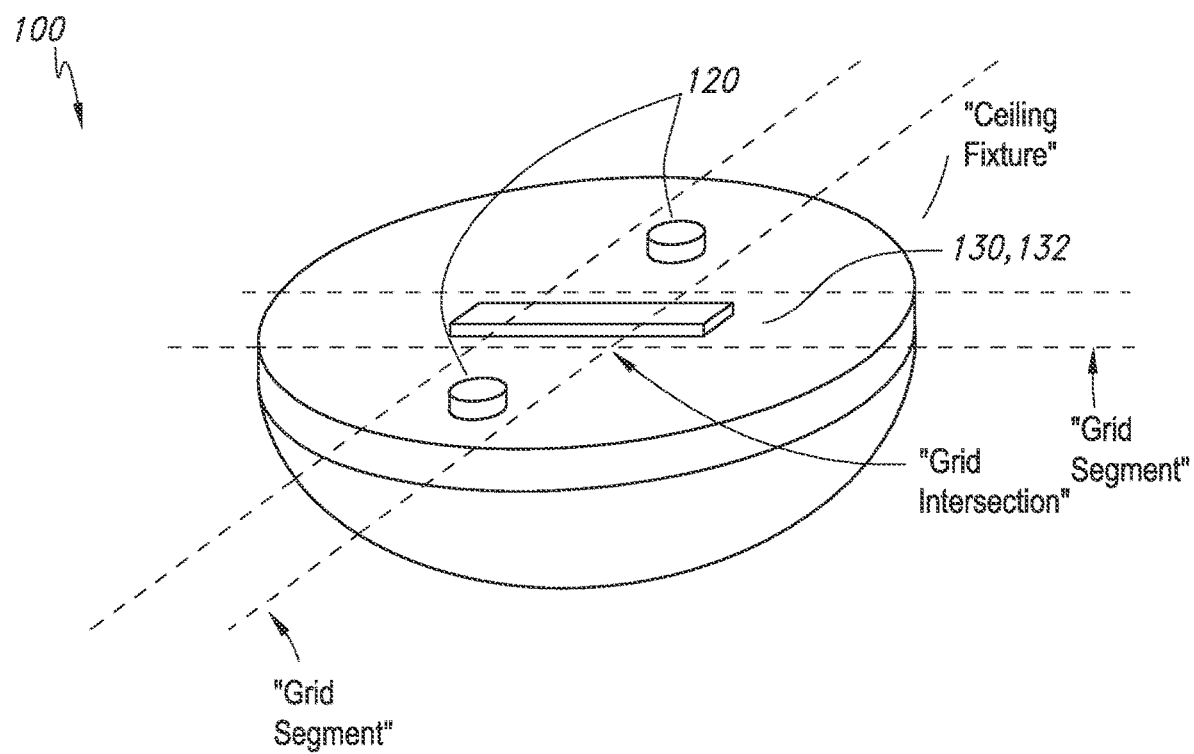
FIG. 5 is a schematic representation of the system.

As shown in FIG. 5, in one variation, the system 100 is integrated with the attached ceiling fixture (e.g., as a component placed along the top surface of the ceiling fixture). More specifically, the system can include a mounting member 110 integrated with a chassis of the ceiling fixture. In this implementation, the system 100 includes a mounting member 110 that also acts as the chassis 116 of the ceiling fixture. For example, the system 100 can include a mounting member 110 that also functions as the top surface of the image sensor. In this implementation, the system 100 includes the set of magnets 120 and registration features 130 that are directly integrated with the upper surface of the attached ceiling fixture that is acting as the mounting member 110.

10. Mounting Kit

Figure 6:
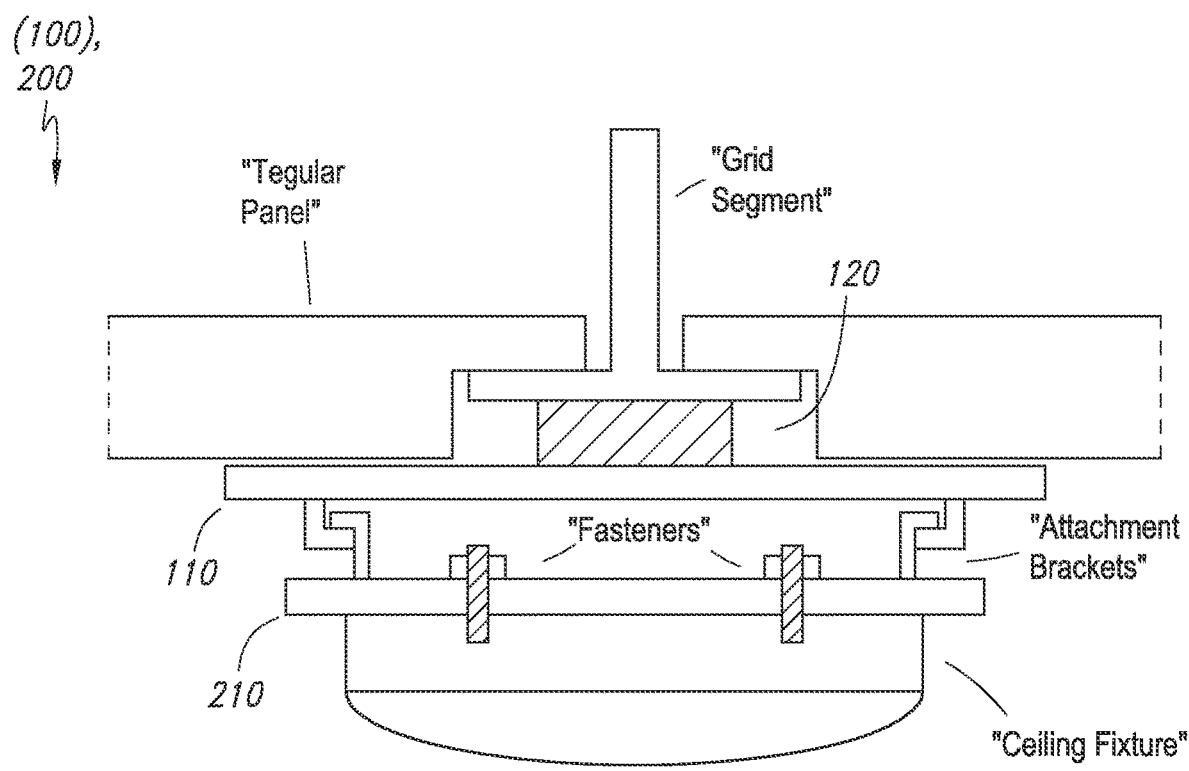
FIG. 6 is a schematic representation of the system.
Figure 7:
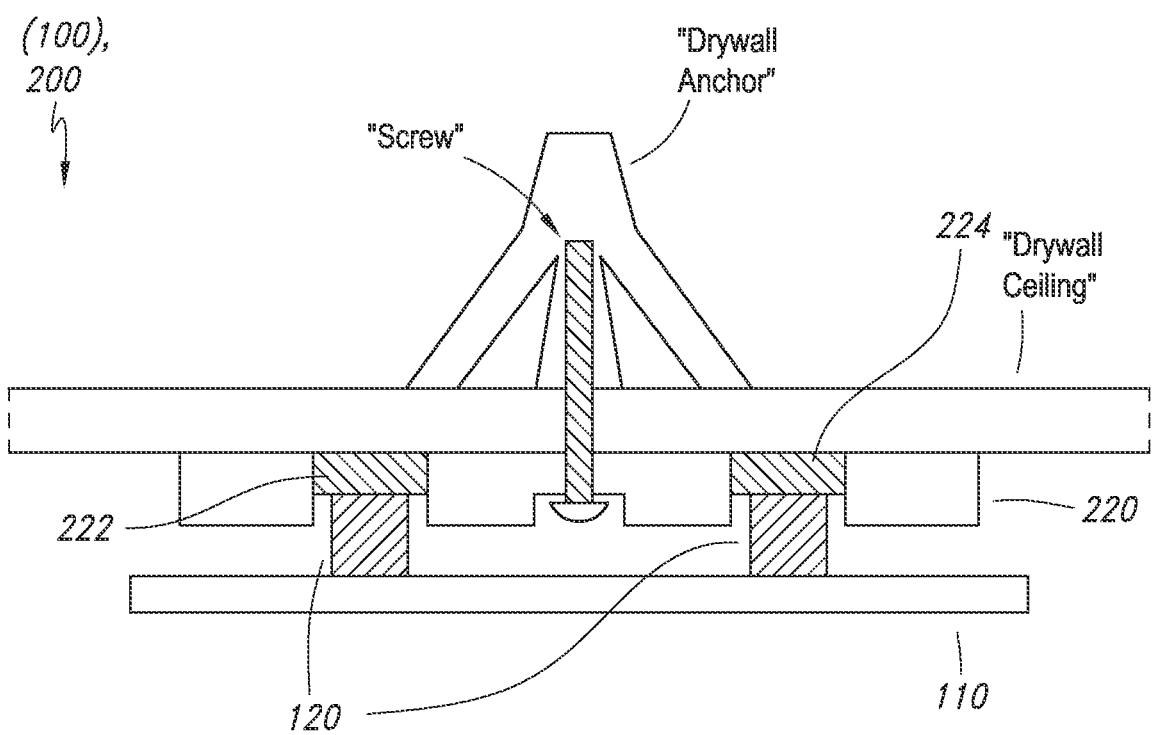
FIG. 7 is a schematic representation of the system.
Figure 8:
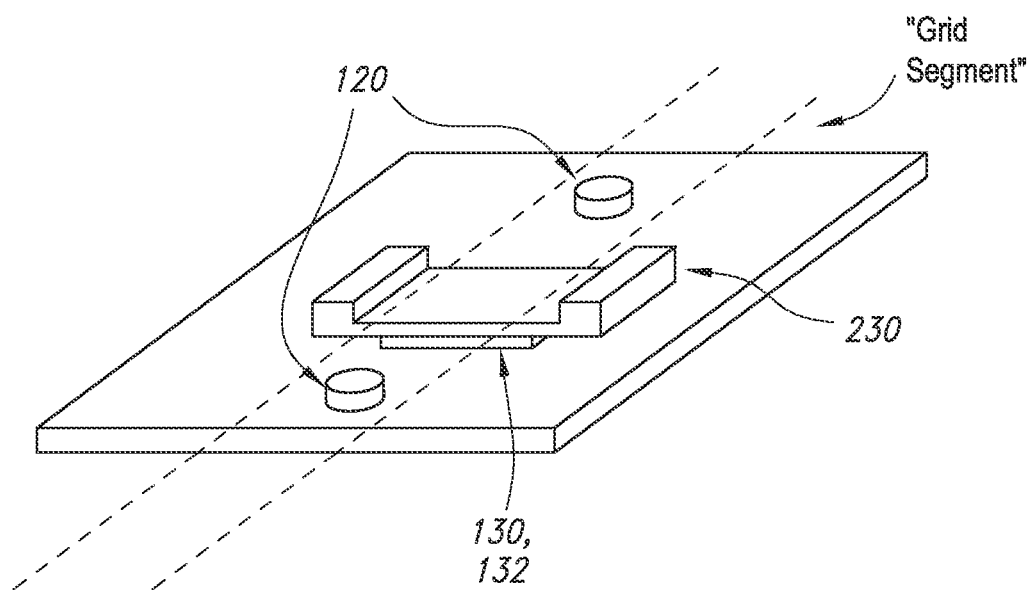
FIG. 8 is a schematic representation of the system.

As shown in FIGS. 6, 7, and 8, a mounting kit 200 can include the system 100, as well as a set of adapters, to enable the system 100 to more securely mount a variety of ceiling fixtures to a variety of ceilings and/or other surfaces. More specifically, the mounting kit 200 can include the system 100 and a set of fixture adapters, drywall adapters, non-tegular adapters, and/or other ceiling or wall adapters, each of which are further described below.

10.1 Fixture Adapters

As shown in FIG. 6, the mounting kit 200 can include an adapter or set of adapters, where each adapter attaches to a particular type of ceiling fixture. More specifically, the adapter can include an adapter member that is configured to attach to the ceiling fixture at its upper face 112 and the mounting member 110 at its lower surface. The adapter member can include mounting brackets, through holes, countersunk and/or threaded holes, mechanical clips, adhesives, studs (screws), clearances for attaching to the ceiling fixture via cable ties, or any other attachment mechanism that enables a single skew of the mounting member 110 to be utilized with many types of ceiling fixtures, which may require differing mounting mechanisms. Thus, mounting kit 200 can include a fixture adapter 210: configured to attach to the mounting member 110 of the system 100; and configured to attach to a chassis of the image sensor.

10.2 Ceiling Adapters

Generally, as shown in FIG. 7, the mounting kit 200 can also include a ceiling adapter or a set of ceiling adapters configured to enable the system 100 to attach to other types of ceilings—such as non-tegular grid ceilings or ceilings that do not include a ferromagnetic grid such as drywall ceilings. More specifically, the mounting kit 200 can include ceiling adapters that further include ferromagnetic elements that are aligned with the arrangement of the set of magnets 120. Additionally, the mounting kit 200 can include a ceiling adapter that includes corresponding features to the registration features 130 of the system 100. Furthermore, the mounting kit 200 can include a ceiling adapter that includes another suitable attachment method to attach the system 100 to a particular type of ceiling. Thus, in this implementation, the system 100 is configured to attach via magnetic coupling of the set of magnets 120 to ferromagnetic features of the ceiling adapter arranged proximal to the lower surface of the ceiling adapter. The ceiling adapter includes a set of mounting features arranged about its upper surface configured to mount to a specific type of ceiling, such as a non-tegular grid ceiling or a drywall ceiling.

In one example, the mounting kit 200 includes a drywall ceiling adapter 220 configured to attach to a drywall ceiling via attachment to a specific ceiling mounted drywall anchor. More specifically, the mounting kit 200 can include a drywall ceiling adapter 220: configured to attach to a drywall ceiling; comprising a first ferromagnetic element 222 configured to engage with the first magnet 122; and comprising a second ferromagnetic element 224 configured to engage with the second magnet 124.

As shown in FIG. 8, mounting kit 200 can include a ceiling adapter for mounting to non-tegular grid ceiling (i.e. grid ceilings where the ceiling panels are recessed above the lower surface defined by the grid). In this implementation, instead of including a ceiling adapter that attaches to the system 100 via magnetic coupling with the set of magnets 120, this non-tegular adapter 230 can secure to the upper surface of the registration features 130 (e.g., via threaded holes on the upper surface of the registration features 130) and can define a U-shaped bracket with an internal width greater than the width of the grid segments of the grid ceiling. Additionally, the system 100 can include registration features 130 modified by the non-tegular adapter 230, which is configured to aid a user in placing the system 100 such that it aligns with the T-bars extending below the recessed panels of the non-tegular grid ceiling. Thus, the mounting kit 200 can include a non-tegular adapter 230: defining a bracket characterized by an internal width greater than a width of a non-tegular grid segment in the assembly of grid segments; and configured to engage with the non-tegular grid segment while the first magnet 122 and the second magnet 124 are magnetically coupled to the assembly of grid segments; and configured to constrain an orientation and a location of the mounting member 110 relative to the assembly of grid segments in response to engagement with the non-tegular grid segment and while the first magnet 122 and the second magnet 124 are magnetically coupled to the assembly of grid segments.

However, the system 100 can include a ceiling adapter 220 configured to attach to any type of ceiling.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for repeatably mounting an image sensor to a grid ceiling comprising a set of ceiling tiles supported by an assembly of grid segments, the system comprising:
   a mounting member defining an upper face;
   a first magnet:
      coupled to the upper face;
      characterized by a first height greater than a protrusion distance of the outer surface of a ceiling tile in the set of ceiling tiles below a grid segment in the assembly of grid segments; and
      characterized by a first width less than an exposed width of the grid segment;
   a second magnet:
      coupled to the upper face; and
      characterized by the first height;
   a detachable registration feature:
      transiently coupled to the mounting member;
      characterized by a second width less than the exposed width of the grid segment;
      configured to align with the assembly of grid segments while the first magnet and the second magnet are magnetically coupled to the assembly of grid segments;
      configured to couple to the assembly of grid segments while the first magnet and the second magnet are magnetically coupled to the assembly of grid segments;
      configured to detach from the upper face and remain coupled to the assembly of grid segments in response to vertical displacement of the upper face away from the assembly of grid segments; and
      defining an engagement surface:
         configured to engage the mounting member in response to replacement of the first magnet and the second magnet against the assembly of grid segments over the detachable registration feature; and
         configured to constrain an orientation and a location of the mounting member relative to the assembly of grid segments in response to engagement with the mounting member and while the first magnet and the second magnet are magnetically coupled to the assembly of grid segments.

2. The system of claim 1, wherein the mounting member defines an interlocking surface:
   configured to engage the engagement surface in response to replacement of the first magnet and the second magnet against the assembly of grid segments over the detachable registration feature; and
   configured to constrain an orientation and a location of the mounting member relative to the assembly of grid segments in response to engagement with the mounting member and while the first magnet and the second magnet are magnetically coupled to the assembly of grid segments.

3. The system of claim 1, wherein the detachable registration feature:
   is transiently coupled to the mounting member with a first adhesive force; and
   is configured to couple to the assembly of grid segments with a second adhesive force greater than the first adhesive force.

4. The system of claim 3:
   wherein the first magnet and the second magnet are characterized by a combined magnetic coupling force to the assembly of grid segments; and
   wherein the detachable registration feature is configured to couple to the assembly of grid segments with the second adhesive force greater than the combined magnetic coupling force and the first adhesive force.

5. The system of 3, wherein the detachable registration feature:
   is magnetically coupled to the mounting member with a first magnetic coupling force; and
   is configured to magnetically couple to the assembly of grid segments with a second magnetic coupling force greater than the first magnetic coupling force.

6. The system of claim 3, wherein the detachable registration feature:
   is magnetically coupled to the mounting member with a magnetic coupling force; and
   is configured to couple to the assembly of grid segments with a non-magnetic adhesive force greater than the magnetic coupling force.

7. The system of claim 1, wherein the detachable registration feature defines a rubberized contact surface configured to contact the assembly of grid segments while the detachable registration feature is coupled to the assembly of grid segments.

8. The system of claim 1, wherein the detachable registration feature is aligned with the first magnet and the second magnet while transiently coupled to the mounting member.

9. The system of claim 1, wherein the detachable registration feature is arranged perpendicular to the first magnet and the second magnet while transiently coupled to the mounting member.

10. The system of claim 9, wherein the detachable registration feature is arranged between the first magnet and the second magnet while transiently coupled to the mounting member.

11. The system of claim 9, wherein the detachable registration feature is laterally offset from the first magnet in a first direction and the second magnet in the first direction.

12. The system of claim 1, further comprising a third magnet:
   coupled to the upper face; and
   characterized by the first height.

13. The system of claim 1, further comprising:
   a third magnet:
      coupled to the upper face; and
      characterized by the first height; and
   a fourth magnet:
      coupled to the upper face;
      characterized by the first height; and
      aligned with the third magnet perpendicular to the first magnet and the second magnet.

14. The system of claim 1, wherein the mounting member is integrated with a chassis of the ceiling fixture.

15. A kit for repeatably mounting an image sensor to a grid ceiling comprising a set of ceiling tiles supported by an assembly of grid segments, the kit comprising:
   a mounting assembly comprising:
      a mounting member defining an upper face;
      a first magnet:
         coupled to the upper face;
         characterized by a first height greater than a protrusion distance of the outer surface of a ceiling tile in the set of ceiling tiles below a grid segment in the assembly of grid segments; and
         characterized by a first width less than an exposed width of the grid segment;
      a second magnet:
         coupled to the upper face; and
         characterized by the first height;
      a detachable registration feature:
         transiently coupled to the mounting member;
         characterized by a second width less than the exposed width of the grid segment;
         configured to align with the assembly of grid segments while the first magnet and the second magnet are magnetically coupled to the assembly of grid segments;
         configured to couple to the assembly of grid segments while the first magnet and the second magnet are magnetically coupled to the assembly of grid segments; and
         configured to detach from the upper face and remain coupled to the assembly of grid segments in response to vertical displacement of the upper face away from the assembly of grid segments; and
      a non-tegular adapter:
         defining a bracket characterized by an internal width greater than a width of a non-tegular grid segment in the assembly of grid segments;
         configured to engage the non-tegular grid segment while the first magnet and the second magnet are magnetically coupled to the assembly of grid segments; and
         configured to constrain an orientation and a location of the mounting member relative to the assembly of grid segments in response to engagement with the non-tegular grid segment and while the first magnet and the second magnet are magnetically coupled to the assembly of grid segments.

16. The kit of claim 15, further comprising a fixture adapter:
   configured to couple to the mounting member of the mounting assembly; and
   configured to couple to a chassis of the image sensor.

17. The kit of claim 15, further comprising a drywall ceiling adapter:
   configured to couple to a drywall ceiling;
   comprising a first ferromagnetic element configured to engage the first magnet; and
   comprising a second ferromagnetic element configured to engage the second magnet.

18. A system for repeatably mounting an image sensor to a grid ceiling comprising a set of ceiling tiles supported by an assembly of grid segments, the system comprising:
   a mounting member:
      defining an upper face;
      defining an interlocking surface with an engagement surface of a detachable registration feature:
         configured to engage the engagement surface in response to replacement of a first magnet and a second magnet against the assembly of grid segments over the detachable registration feature; and
         configured to constrain an orientation and a location of the mounting member relative to the assembly of grid segments in response to engagement with the mounting member and while the first magnet and the second magnet are magnetically coupled to the assembly of grid segments;
   the first magnet:
      coupled to the upper face;
      characterized by a first height greater than a protrusion distance of the outer surface of a ceiling tile in the set of ceiling tiles below a grid segment in the assembly of grid segments; and
      characterized by a first width less than an exposed width of the grid segment;
   the second magnet:
      coupled to the upper face; and
      characterized by the first height; and
   the detachable registration feature:
      transiently coupled to the mounting member;
      characterized by a second width less than the exposed width of the grid segment;
      configured to align with the assembly of grid segments while the first magnet and the second magnet are magnetically coupled to the assembly of grid segments;
      configured to couple to the assembly of grid segments while the first magnet and the second magnet are magnetically coupled to the assembly of grid segments;
      configured to detach from the upper face and remain coupled to the assembly of grid segments in response to vertical displacement of the upper face away from the assembly of grid segments; and
      defining the engagement surface with the mounting member.

19. The method of claim 1, wherein the mounting member:
   defines a lower face opposite the upper face; and
   defines a visual indicator arranged on the lower face and configured to constrain the orientation of the mounting member.

20. The method of claim 15, wherein the detachable registration feature is characterized by a second height less than the first height.

* * * * *